Oct. 9, 1962 R. T. CORNELIUS 3,057,668
PISTON CONSTRUCTION
Filed March 14, 1960 2 Sheets-Sheet 1

INVENTOR
RICHARD T. CORNELIUS

Caswell + Lagaard
ATTORNEYS

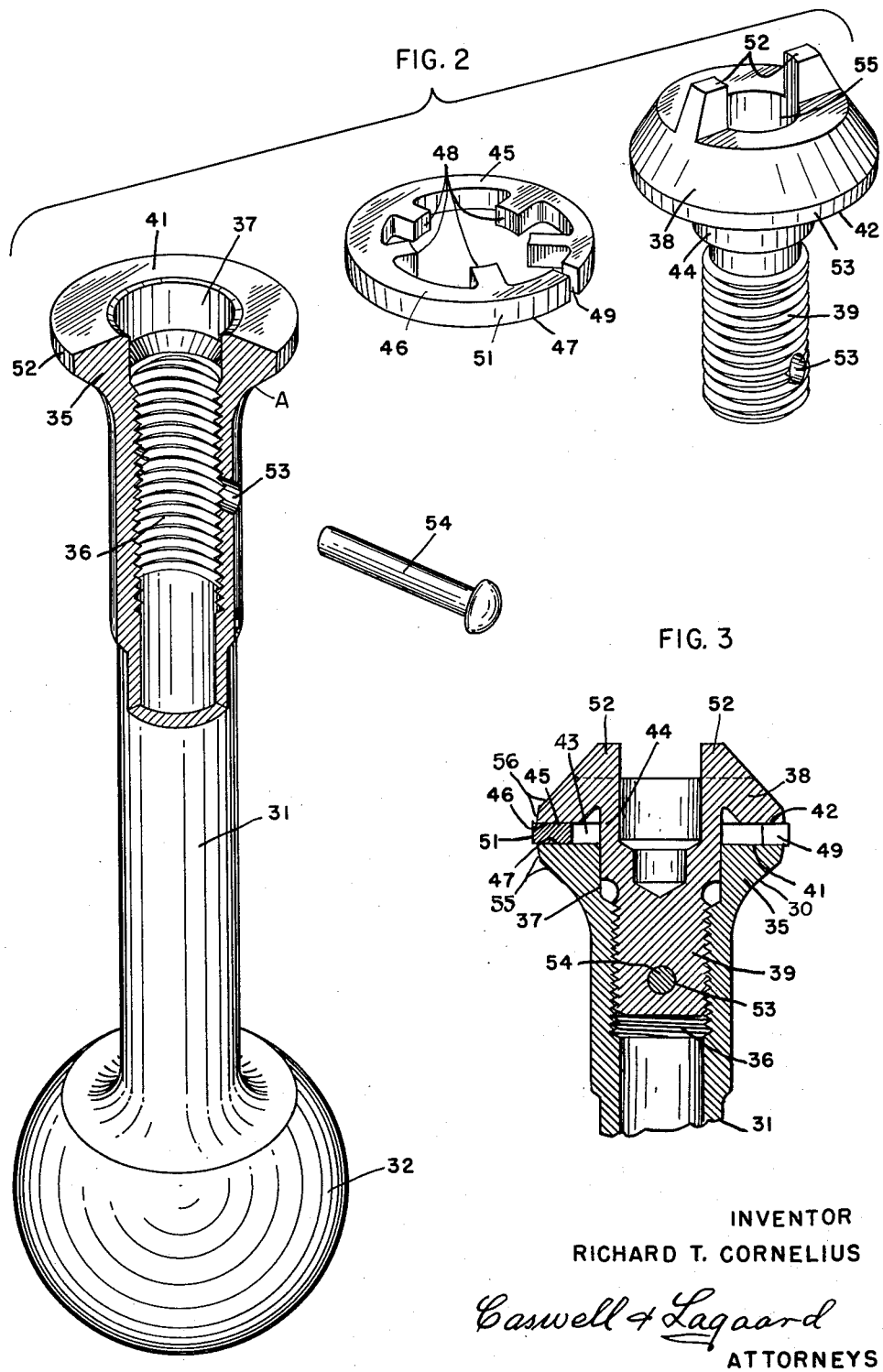

United States Patent Office 3,057,668
Patented Oct. 9, 1962

3,057,668
PISTON CONSTRUCTION
Richard T. Cornelius, Minneapolis, Minn., assignor to Stewart-Warner Corporation, Chicago, Ill., a corporation of Virginia
Filed Mar. 14, 1960, Ser. No. 14,897
4 Claims. (Cl. 309—17)

The herein disclosed invention relates to piston construction and has for an object to provide a construction eliminating in a swinging connecting rod the usual pivotal connection between the connecting rod and piston.

Another object of the invention resides in providing a piston utilizing a piston ring having a crowned engaging surface, and in constructing the portions of the piston adjacent the ring to recede therefrom.

A still further object of the invention resides in constructing the piston ring in the form of a plate with the cylinder engaging surface spheroidal in form.

Another object of the invention resides in providing the piston with a piston body fixed on the outer end of the piston rod underlying the piston ring and extending outwardly from the connecting rod, but falling short of the cylinder engaging surface of the piston ring.

Another object of the invention resides in providing the connecting rod with a threaded bore.

A still further object of the invention resides in providing the piston with a piston head overlying the body of the piston and having a threaded stem screwed into the threaded bore, said head overlying the piston and extending outwardly from said stem, but falling short of the cylinder engaging surface of the head.

A further object of the invention resides in providing the body and head with lateral surfaces of revolution receding in opposite directions away from the cylinder contacting surface of the piston ring.

Another object of the invention resides in providing the piston ring with spokes engaging said stem and restraining substantial radial movement of the piston ring relative to the connecting rod.

Other objects of the invention reside in the novel combination and arrangement of parts and in the details of construction hereinafter illustrated and/or described.

In the drawings:

FIG. 2 is an exploded perspective view of the parts of the piston construction drawn to an enlarged scale.

FIG. 3 is a fragmentary sectional view taken on line 3—3 of FIG. 1 and drawn to an enlarged scale.

Figure 1:
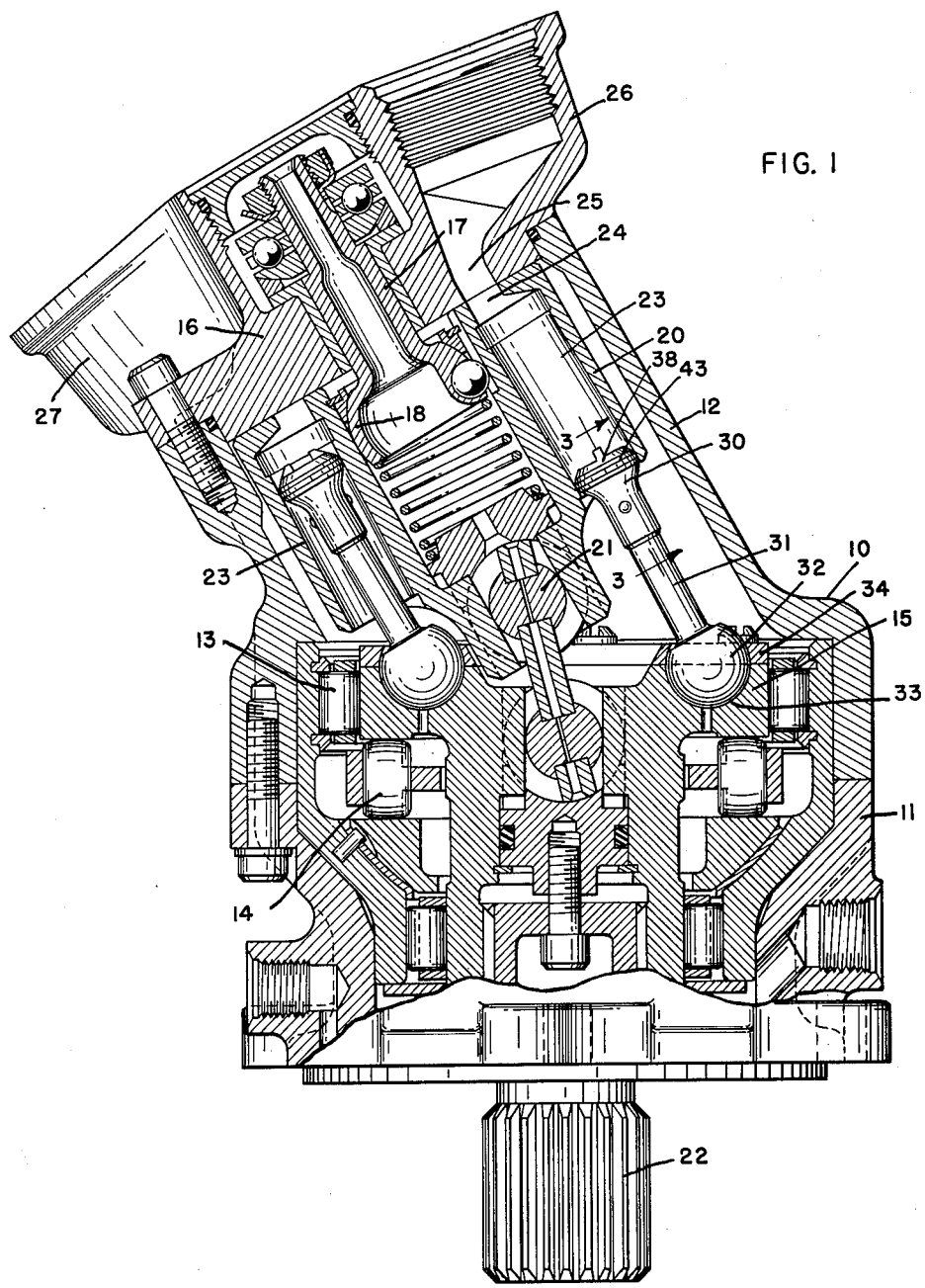
FIG. 1 is a vertical sectional view of a pump illustrating an embodiment of the invention applied thereto.

For the purpose of illustrating the invention, a pump 10 has been shown which includes a base 11 and on which is mounted a case 12. Mounted within the base 11 are bearings 13 and 14 which rotatably support a rotor 15. Mounted on the case 12 is a valve head 16 having a spindle 17. This spindle has a spheroidal shaped end 18 which rotatably supports a revoluble cylinder block 20. The axis of the spindle 17 and cylinder block 20 form an angle with the axis of the bearings 13 and rotor 15. Acting between the cylinder block 20 and the rotor 15 is a universal joint 21. The rotor 15 is driven by a splined shaft 22 from any suitable source of power and constitutes the driving member of the pump. The cylinder block 20 is driven from the rotor 15 through the universal joint 21 and constitutes the driven member of the pump. It will, however, be readily comprehended that fluid under pressure may be supplied to the pump to form a motor out of the same, in which case the driving and driven elements would be reversed.

Formed in the cylinder block 20 are a number of cylinders 23 which are arranged in the form of a circle concentric with the axis of the spindle 17. These cylinders have passageways 24 which are adapted to communicate with ports 25 formed in the valve head 16 and communicating with an inlet 26 and an outlet 27. Slidable in the cylinders 23 are piston structures A comprising pistons 30 and connecting rods 31 attached thereto. These connecting rods have attached to the ends of them balls 32 which are seated in sockets 33 formed in the rotor 15. A retaining plate 34 secured to said rotor holds the balls 32 within said sockets.

The piston 30 consists of a piston body 35 which is integral with the connecting rod 31. A threaded bore 36 in the end of the connecting rod 31 adjacent body 35 communicates with an enlargement 37 of said bore formed in the body 35 of the piston and which opens outwardly through said body.

Co-operating with said body 35 of piston structure 30 is a head 38 mounted on a threaded stem 39. The body 35 is formed at its outer end with a planiform radial surface 41 and, similarly, the head 38 is formed with a corresponding planiform surface 42 facing the surface 41. The stem 39 is adapted to be screwed into the threaded bore 36 in connecting rod 31 and, when properly positioned, the surface 42 is spaced from the surface 41 of the body 35 to form an annular space 43 therebetween. To maintain the head 38 and body 35 coaxial, the stem 39 is formed at its juncture with said head with a cylindrical collar 44 integral with said stem and head. This collar fits snugly within the enlargement 37 of bore 36 and maintains the head 38 accurately centered relative to the body 35.

The piston 30 further includes a piston ring 45 disposed in space 43 which is plate-like in form having upper and lower parallel planiform surfaces 46 and 47. The surface 46 faces surface 42 of head 38 while the surface 47 faces surface 41 of body 35. Piston ring 45 is formed with spokes 48 which engage the collar 44 and center said ring relative to piston body 35. A kerf 49 in said ring allows for expansion of the ring. The piston ring 45 is formed with a spherical outer surface 51 coaxial with the axis of the cylinder 23. This surface is of slightly greater diameter than the diameter of cylinder 23 so that when the ring is sprung together and released in the cylinder it fits tightly in the cylinder. The lateral surfaces of revolution 55 and 56 of the body 35 and head 38 recede from the surface 51 of the piston ring 45 and are of a diameter slightly less than that of the cylinders. By means of this construction, these surfaces recede in a direction away from the piston ring 45.

In assembling the piston structure, the ring 45 is placed on the collar 44 while the stem 39 extends upwardly. The piston construction A is then inverted and screwed on the stem until the ring is tightly clamped between the surfaces 41 and 42. The head 38 is then backed up sufficiently to give the desired clearance for movement of the piston ring. For this purpose, lugs 52 are formed on the head for engagement with a wrench. The parts are then held in position, and a hole such as indicated at 53 is drilled in the connecting rod 31 and the stem 39. A pin 54 is driven in the hole and riveted over to clamp the parts in position.

The advantages of the invention are manifest. An extremely simple construction is provided by the use of a minimum number of parts. The wrist pin and corresponding bearings usually employed with piston structures is completely dispensed with. Where the motor is run at a sufficiently high rate of speed, leakage past the piston ring is within tolerable limits. By means of the construction shown, the formation of an accurate groove of specific dimensions for the piston proper is done away with. Also, the machining of the surfaces forming the groove for the same is greatly facilitated. When wear takes place, the head can be readjusted with reference to the piston body and a new hole drilled to permit of inserting the retaining pin to hold the structure in its newly adjusted position.

Changes in the specific form of the invention, as herein described, may be made within the scope of what is claimed without departing from the spirit of the invention.

Having described the invention, what is claimed as new and desired to be protected by Letters Patent is:

1. In a piston construction, a connecting rod, a piston body on one end of said connecting rod, said connecting rod and body having a threaded bore therein extending along the same and open at the outer end of said body, a piston head having a threaded stem screwed into said threaded bore, and adjustable axially along said connecting rod, said body and head having facing annular radial surfaces forming an annular space therebetween, a piston ring disposed in said space and having an outer spherical surface, said body and head having surfaces of revolution adjacent said annular surface coaxial with the axis of the piston ring and receding inwardly from the spherical surface of said piston ring and a pin extending through said connecting rod and stem and holding said head in axially adjusted position relative to said body.

2. In a piston construction, a connecting rod, a piston body on one end of said connecting rod, said connecting rod and body having a threaded bore therein extending along the same and open at the outer end of said body, a piston head having a threaded stem screwed into said threaded bore, said body and head having facing annular radial surfaces forming an annular space therebetween, said stem having a centering section at the outer end thereof adjacent the annular surface thereon and of a greater diameter than that of the threaded portion of the stem and disposed within said space, an expansible piston ring disposed in said space and having radially extending spokes engageable with said centering section to center the piston ring on said stem, said piston ring having an outer spherical surface, and said body and head having surfaces of revolution adjacent said annular surfaces coaxial with the axis of the piston ring and receding inwardly from the spherical surface of said piston ring.

3. In a piston construction, a connecting rod, a piston body on one end of said connecting rod, said connecting rod and body having a threaded bore therein extending along the same and open at the outer end of said body, a piston head having a threaded stem screwed into said threaded bore, said body and head having facing annular radial surfaces forming an annular space therebetween, said space being adjustable in an axial direction by means of said threaded connecting rod and body and said threaded stem, said stem having a centering section at the outer end thereof adjacent the annular surface thereof and of a greater diameter than that of the threaded portion of the stem and disposed partly within said space, said body having a cylindrical enlargement of said bore at the open end thereof, concentric therewith, said centering section having a portion received in said enlargement and maintained in concentric relation with respect to said connecting rod thereby, an expansible piston ring disposed in said space and engageable with said centering section to center the piston ring on said stem, said piston ring having an outer spherical surface, and surfaces of revolution on said body and head, adjacent said annular surfaces, coaxial with the axis of the piston ring and receding inwardly from the spherical surface of said piston ring and a pin extending through said connecting rod and stem and maintaining the annular surfaces of said head and body in axially adjusted position relative to one another.

4. In a piston construction, a connecting rod, a piston body on one end of said connecting rod, said connecting rod and body having a threaded bore therein extending along the same and open at the outer end of said body, a piston head having a threaded stem screwed into said threaded bore, said body and head having facing annular radial surfaces forming an annular space therebetween, said space being adjustable in an axial direction by means of said threaded connecting rod and body and said threaded stem, said stem having a centering section at the outer end thereof adjacent the annular surface thereon and of a greater diameter than that of the threaded portion of the stem and disposed partly within said space, said body having a cylindrical enlargement of said bore at the open end thereof, concentric therewith, said centering section having a portion received in said enlargement and maintained in concentric relation with respect to said connecting rod thereby, an expansible piston ring disposed in said space and engageable with said centering section to center the piston ring on said stem, said piston ring having an outer spherical surface, and surfaces of revolution on said body and head adjacent said annular surfaces, coaxial with the axis of the piston ring and receding inwardly from the spherical surface of said piston ring and a pin extending through said connecting rod and stem at a locality inwardly of said centering section and body and maintaining the annular surfaces of said head and body in axially adjusted position relative to one another.

References Cited in the file of this patent

UNITED STATES PATENTS

| 2,250,512 | Vickers | July 29, 1941 |
| 2,549,711 | Ruben | Apr. 17, 1951 |
| 2,649,741 | Henricksen | Aug. 25, 1953 |
| 2,658,809 | Schultz | Nov. 10, 1953 |
| 2,768,037 | Payne | Oct. 23, 1956 |
| 2,921,536 | Cornelius | Jan. 19, 1960 |
| 2,956,845 | Wahlmark | Oct. 18, 1960 |

FOREIGN PATENTS

| 95,979 | Sweden | June 13, 1939 |
| 218,440 | Australia | Aug. 15, 1957 |